INVENTOR
BALTZAR CARL VON PLATEN

INVENTOR
BALTZAR CARL VON PLATEN
ATTORNEYS

June 15, 1971  B. C. VON PLATEN  3,584,336
METHOD OF INCREASING THE STRENGTH OF A HOUSING
AND A HIGH PRESSURE APPARATUS INCORPORATING
A STRENTGHTNED HOUSING
Filed March 3, 1969  7 Sheets-Sheet 3

INVENTOR
BALTZAR CARL VON PLATEN
BY Holman, Glascock,
Downing & Seebold
ATTORNEYS June 15, 1971  B. C. VON PLATEN  3,584,336
METHOD OF INCREASING THE STRENGTH OF A HOUSING
AND A HIGH PRESSURE APPARATUS INCORPORATING
A STRENTGHTNED HOUSING
Filed March 3, 1969  7 Sheets-Sheet 4

INVENTOR
BALTZAR CARL VON PLATEN

INVENTOR
BALTZAR CARL VON PLATEN
ATTORNEYS

United States Patent Office 3,584,336
Patented June 15, 1971

3,584,336
METHOD OF INCREASING THE STRENGTH OF A HOUSING AND A HIGH PRESSURE APPARATUS INCORPORATING A STRENGTHENED HOUSING
Baltzar Carl von Platen, Stockholm, Sweden, assignor to Etablissement Radiator, Vaduz, Liechtenstein
Filed Mar. 3, 1969, Ser. No. 803,648
Claims priority, application Sweden, Mar. 4, 1968, 2,780/68
Int. Cl. F16j *11/00*
U.S. Cl. 18—5                                   17 Claims

ABSTRACT OF THE DISCLOSURE

An improved housing for a high pressure chamber is described. The primary resistance to radial pressures developed in the high pressure chamber is provided by a housing which is split into a number of separate pieces having gaps between, the gaps being included in one or more closed spaces filled with pressure supporting material, i.e. material which acts as a liquid at high pressure, and which is pressurized as the pressure in the high pressure chamber is increased.

---

The present invention relates to a method of increasing the strength of a housing, intended to surround a chamber in which a high pressure is to be generated. The invention further relates to high pressure apparatus having a strengthened housing.

It is known that the compressive strength of a housing may be increased by dividing at least the inner part of the housing located near the high pressure chamber, and forming primary resistance to radial pressures, into a number of preferably regular or symmetrical pieces or parts. In this way it is possible to increase the volume of the high pressure chamber. In connection with cylindrical and spherical containers this has been described in an article by Baltzar von Platen in "Modern Very High Pressure Techniques," edited by R. H. Wentorf and published by Butterworths of London in 1962. The article is to be found at pages 118–136. Reference may also be made to U.S. Pat. 2,554,499.

It is also known that a pressure generating member such as a piston, is able to resist greater specific compressive axial loads or pressures when the outer or free cylindrical surface of the member is subjected to a specific pressure which is known as a supporting pressure. This supporting pressure is usually provided by materials of a sort which are known as pressure-supporting materials.

The expression pressure-supporting material is understood to signify compressible pressure-transmitting materials which at high pressures behave as liquids, or substantially as liquids. In essence, such pressure-supporting materials have the ability to transmit hydrostatic pressures at the very high pressures prevailing in spaces in which they are found.

Examples of materials which are known to be pressure-supporting are sodium, potassium, lead, indium, copper, a sodium potassium alloy which is liquid at room temperatures, and the first, third and fifth normal alcohols.

It is generally to be noted that the alcohols can be used for supporting pressures of up to about 30,000 atmospheres, whereas if the supporting pressures are to be above this level, then the metals or alloys have to be used. In general, the alcohols can be used to transmit the supporting pressures through very narrow spaces, but the metals, which behave as more viscous liquids than the alcohols, generally need to have greater clearances through which to operate.

Hitherto, it has not been possible to provide for high pressure chambers in high pressure apparatus to have effective volumes greater than some tens of cubic centimeters. This is due to the difficulty of providing a casing for a comparatively large chamber to resist the very high pressures which are generated within the high pressure chamber, and prevent bursting of the chamber or the surrounding casings. Furthermore, the known high pressure chambers of such volumes are mechanically very complicated so that assembly and dismantling of the apparatus before and after every high pressure treatment is very time consuming.

It is an object of the present invention to provide a form of supporting housing of a high pressure chamber which is suitable for larger high pressure chambers than have hitherto been obtainable, and which is also capable of being comparatively simply assembled and dismantled.

The invention accordingly consists in a method of increasing the strength of a housing surrounding a high pressure chamber in which high pressure is to be generated by two opposed pressure generating members, at least one of which is movable inwards towards the centre of the high pressure chamber, a part of the housing, situated close to the high pressure chamber and forming a primary resistance to radial pressures therein, being composed by separate pieces, characterized in that the pieces are separated by gaps and each gap constitutes a closed space or part of a closed space, and that supporting pressure for the pieces is generated by pressure supporting material put under pressure in the said gaps.

The invention further consists in a high pressure apparatus comprising a high pressure chamber and a housing surrounding the high pressure chamber, the housing including two opposed pressure generating members, at least one of which is movable towards the centre of the high pressure chamber, and the housing further including a composite body surrounding the high pressure chamber and forming a primary resistance to radial pressure in the high pressure chamber, the said composite body being composed of separate pieces, characterized in that the separate pieces are separated by gaps and each gap contains pressure supporting material and constitutes a closed space or part of a closed space within which the pressure supporting material is adapted to be pressurized as the movable pressure generating member moves towards the high pressure chamber.

As mentioned above, the pressure supporting material acts at high pressures substantially as a liquid, and is therefore able to flow into and through the gaps where supporting pressure must be present during the use of the apparatus.

It is also within the scope of the present invention to use similar techniques to provide supporting pressure at other points of the apparatus, and in certain circumstances, it may also be useful for the pressure supporting material to act as a lubricant itself, or to have incorporated therein a material which does not detract from the pressure-supporting function of the pressure supporting material but which also acts as a lubricant. An example of such a material is molybdenum disulphide.

The invention will be further described with reference to the accompanying drawings which show different forms of high pressure apparatus.

Figure 1:
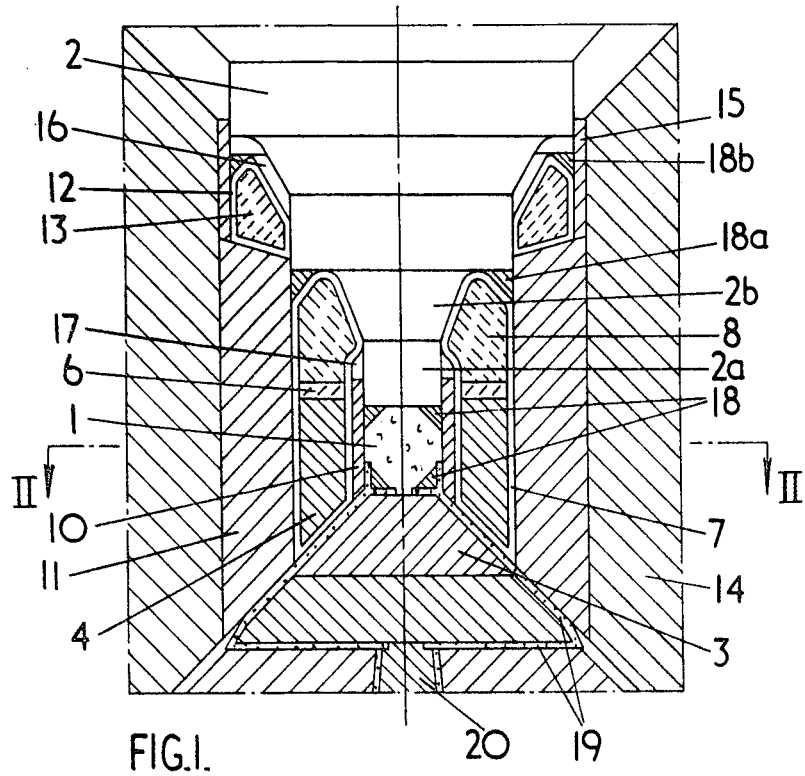
FIG. 1 shows a sectional view through the axis of one form of construction of apparatus according to the invention.
Figure 2:
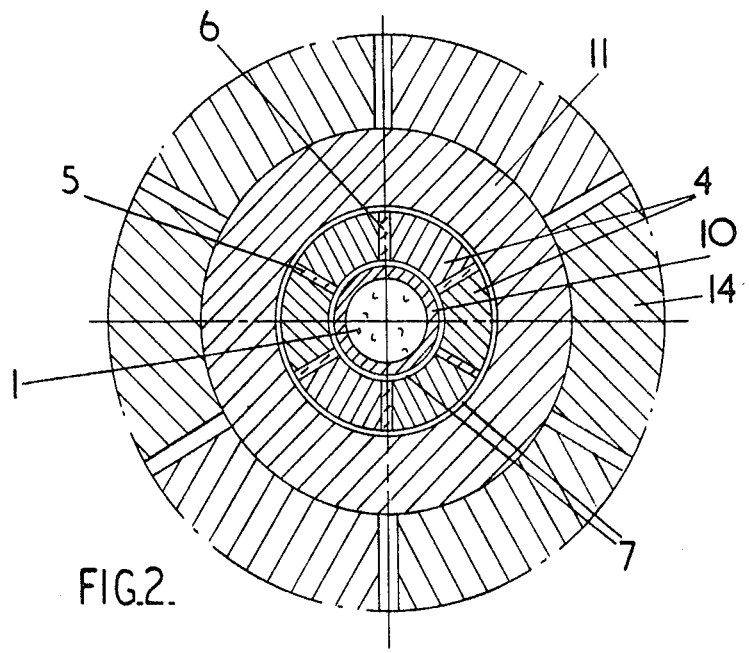
FIG. 2 is a sectional view along the line II—II of FIG 1.
Figure 2A:
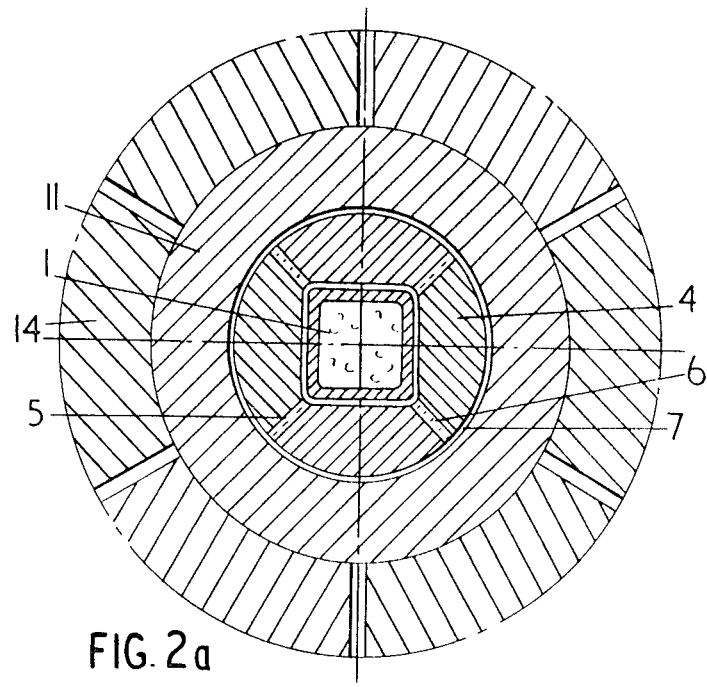
FIG. 2a is a view similar to FIG. 2 and showing a modification thereof.
Figure 2B:
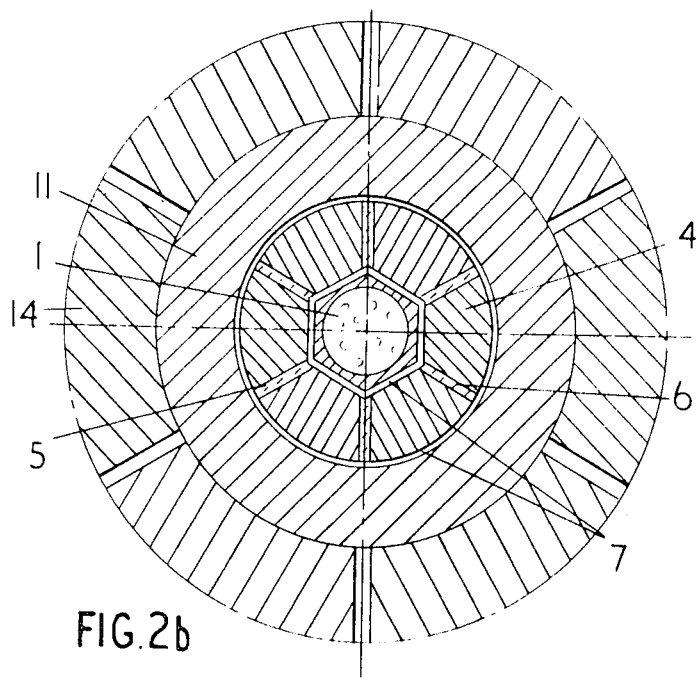
FIG. 2b is a further similar view showing a further modification.

Referring first to FIGS. 1 and 2, it would be seen that the apparatus includes a housing surrounding a high pressure chamber 1. The chamber 1 is to be used for the generation of high pressures and possibly also for high temperatures. The pressure is generated principally by pressure generating member 2 and 3, of which the member 2 is in the form of a piston, movable towards and away from the centre of the particular embodiment illustrated. The member 3 is in the form of a fixed anvil but it will be understood that the member 3 could also be a movable piston.

The housing comprises pieces 4 which together constitute a primary means for resisting radial pressure. The pieces 4 are separated by gaps 5, each of which constitutes a closed chamber or a part of a closed chamber. In each gap 5 there is pressure-supporting material 6 (as hereinbefore defined). The pieces 4 form together with the gaps 5 (see FIGS. 2, 2a, 2b, 4, 5, 6, 7 and 10) a body with a cylindrical outer surface and with an inner surface defining an aperture symmetrical about the axis. The principal function of the aperture is to form the high pressure chamber 1. The pieces 4, the gaps 5 and the enclosed pressure-supporting material are enclosed in a sealed, deformable casing 7. The casing 7 is shown as extending above the aperture in the body, and it provides a space forming a girdle which surrounds and can bear on part of the movable pressure generating member 2. The girdle is filled with pressure-supporting material 8, which may be the same material as the pressure-supporting material 6, or may be of some other type. In this latter case, the different materials are preferably separated by a sealing membrane 9 of deformable material (as shown in FIG. 6).

It is within the scope of the invention to make the central aperture in the body so that it has, in section, the shape of a circle (FIG. 2), a square (FIG. 2a), a hexagon (FIG. 2b) or any other polygon.

The pressure generating member 2 is preferably formed of alternating pieces of which the inner piece 2a has a constant cross-section and the outer piece 2b has a section that increases with increasing distance from the high pressure chamber 1. Inside the central aperture there is located a cylinder 10 having relatively thin walls. The pieces 4 and the casing 7 are surrounded by a further cylinder 11, which has relatively thick walls.

Above and in contact with the cylinder 11 there is a further sealed deformable casing 12 forming an outer girdle filled with pressure-supporting material 13. The cylinder 11 is itself surrounded by a cylindrical body 14 which is built up by pieces separated by gaps. A relatively thin ring 15 surrounds the casing 12. When the apparatus is not under pressure the casing 12 and the adjacent part of the movable pressure generating member 2 are separated by a clearance 16.

A space 17 between the innermost cylindrical part 2a of the movable pressure generating member and the cover 7 is filled with a pressure-supporting material which can also act as a lubricant. Preferably, the lubricant is formed by the pressure-supporting material itself, but it is possible for a separable lubricant to be suspended or otherwise incorporated in the pressure-supporting material. The high pressure chamber 1 also includes a pair of gasket-rings 18. Further gasket-rings 18a and 18b are placed near the upper ends of the casings 7 and 12.

The fixed member 3 is electrically insulated from the outer part of the apparatus by an insulating layer 19. Electrical current may be supplied to the high pressure chamber 1 through a terminal 20 and external circuitry which is not illustrated.

Figure 12:
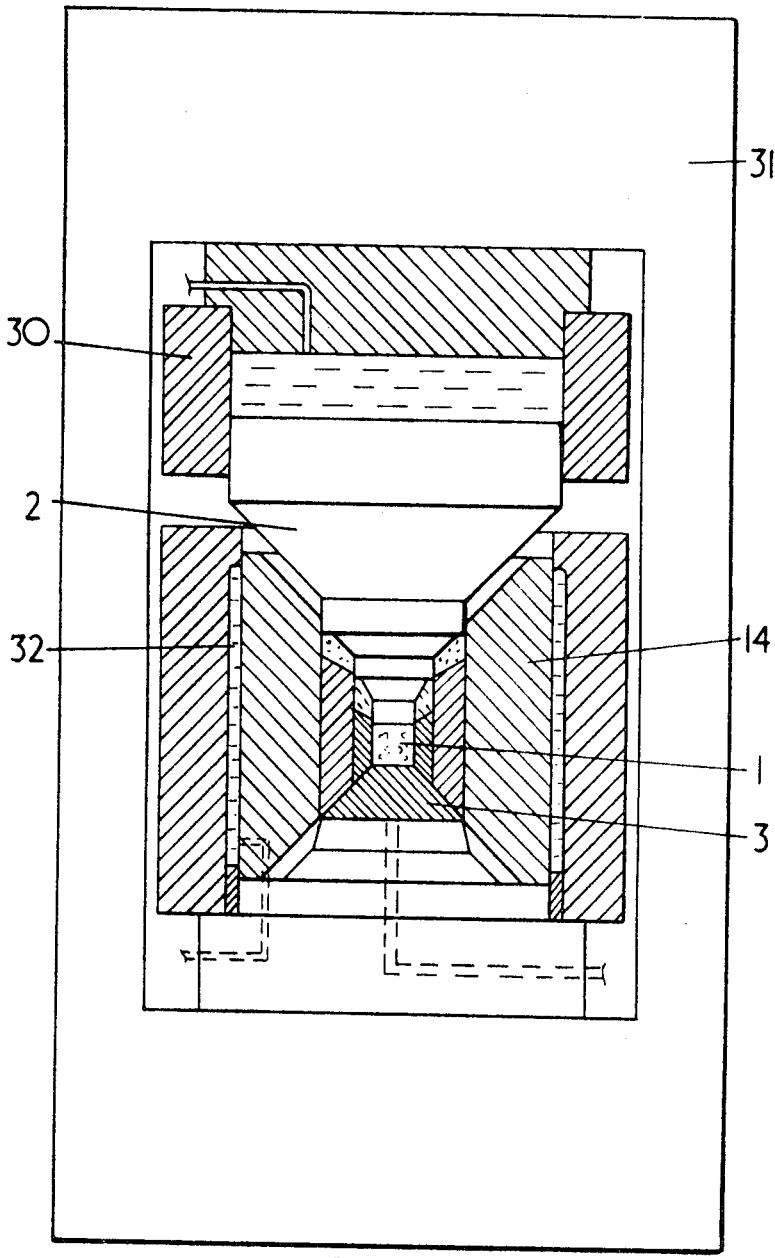
FIG. 12 is a general view, partially in section, of a complete high pressure apparatus including a high pressure chamber according to any of the preceding figures.

Referring now to FIG. 12, it can be seen that the movable pressure generating member 2 is urged downwards towards the high pressure chamber 1 by a hydraulic press 30 which is mounted in a suitable frame 31. The cylindrical body 14 is surrounded by a hydraulic pressure chamber 32.

The operation of the apparatus so far described is as follows. The movable pressure generating member 2 is slowly moved inwardly by the hydraulic press 30 towards the centre of the high pressure chamber 1. Simultaneously, the hydraulic pressure chamber 32 is pressurized so as to urge the body 14 inwardly towards the axis of the high pressure chamber 1. The pieces making up the cylindrical body 14 will under these conditions generate an increasing specific pressure on the thick wall cylinder 11.

At the same time the pressure in the pressure-supporting material 8 in the girdle formed by the casing 7 will be increased and the pressure-supporting material in the space 17 will be pressurized between this pressure-supporting material 8 and the innermost cylindrical part 2a. The innermost parts 2a and 2b will thus receive supporting pressures respectively from the pressure-supporting material in the space 17 and from the pressure-supporting material 8. Pressure-supporting material 6 is simultaneously forced into the gaps 5 between the pieces 4, and the pressure-supporting material 6 gives the pieces 4 supporting pressure in directions normal to the surfaces of the pieces 4 defining the gaps 5. The pressure-supporting material 8 and 6 above the parts 4 also gives supporting pressure in an axial direction. As the movable member 2 moves inwardly, the thickness of the clearance 16 reaches zero, the pressure-supporting material 13 in the outer girdle formed by the casing 12 is also pressurized. In this way supporting pressure is also generated for further parts of the movable pressure generating member 2.

The use of two separate girdles each filled with pressure-supporting material to support different parts of the pressure generating member 2 gives a considerable reduction in the pressure necessary to move the member 2 since the pressure in the outer girdle namely the one formed by the casing 12, can be considerably lower than in the girdle formed by the casing 7 without risking disintegration of member 2. Further, the forces acting on the frame 31 will be substantially reduced by this which leads to a considerable saving in capital cost.

It is possible for more than two separate girdles to be filled with pressure-supporting material for supporting different parts of movable member 2, and the required pressures would decrease with distance from the axis of the high pressure chamber 1.

The volume of the pressure-supporting material to be used must be chosen so that sufficient supporting pressure is applied to the various parts of the apparatus when the pressure in the high pressure chamber 1 reaches its maximum operating level.

Figure 9:
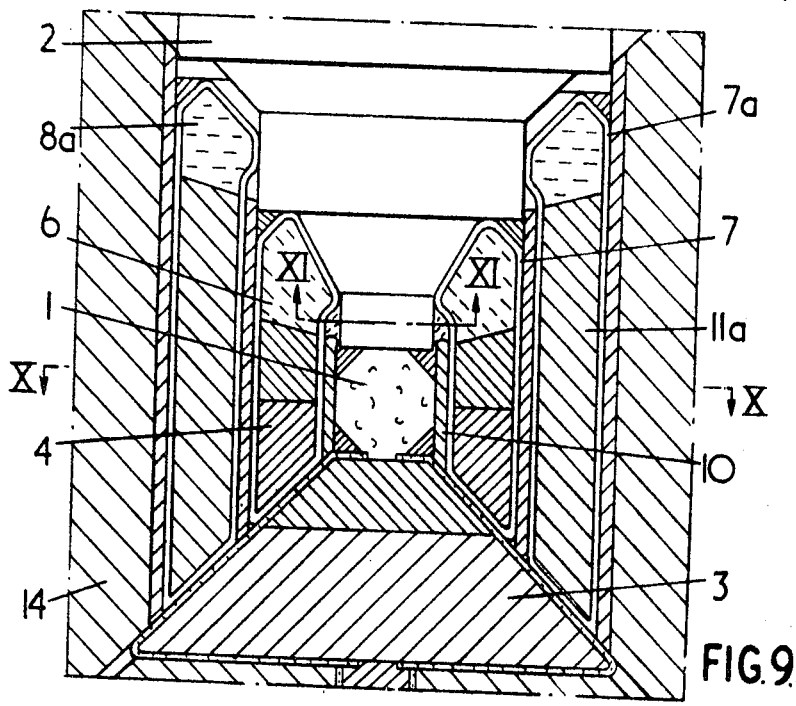
FIG. 9 shows a still further alternative form of construction of apparatus according to the invention.
Figure 10:
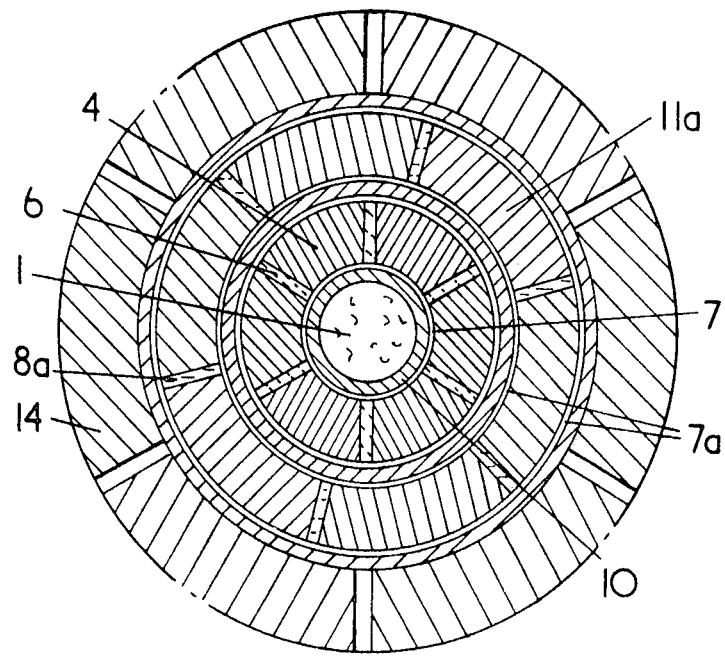
FIG. 10 is a section along the line X—X of FIG. 9.

In FIGS. 1-8, the thick wall cylinder 11 has been shown in one piece. FIGS. 9 and 10 show an embodiment of the invention in which the thick wall cylinder is divided into pieces 11a, which are surrounded by a sealed deformable casing 7a. It has to be noted that the casing 7a incorporates the girdle 12 and it includes pressure-supporting material 8a which is forced into the gaps between the pieces 11a when the upper part of the casing 7a comes under the pressure of the movable pressure generating member 2. In the early stages of the movement of the member 2, there is no need for supporting pressure to be provided between the pieces 11a since at this stage the pieces 4 can withstand the pressure exerted on them without the need for full pressurization of the pieces 11a. These figures also show the possibility of dividing the pieces 4 along planes normal to the axis of the high pressure chamber 1.

Figure 11:
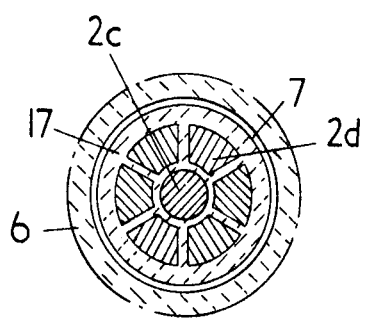
FIG. 11 is a section along the line XI—XI of FIG. 9.

FIG. 11 shows how the innermost part 2a of the movable pressure generating member 2 may also be provided with a central cylindrical piece 2c and also outer pieces 2d surrounding the piece 2c. Gaps are provided between these pieces 2c and 2d and these gaps may be filled with pressure-supporting material.

Figure 8:
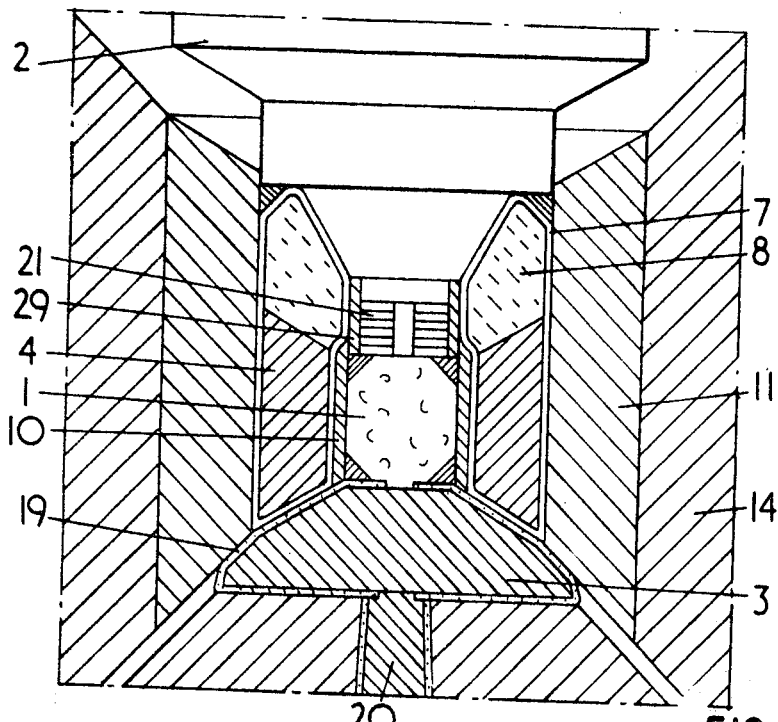
FIG. 8 is a sectional view of a further alternative form of construction of apparatus according to the invention.

The modification of the apparatus shown in FIG. 8 is that the inner part of the movable member 2a is formed of discs 21. The point of this is that as each disc loses supporting pressure on penetration into the high pressure chamber 1, it can be allowed to disintegrate. The active tip of the movable pressure member is thus made disposable or cheaply replaceable so that the same movable member 2 may be used for a large number of operations with only replacement of the discs 21 being necessary. In order to avoid the unnecessary friction arising from the material from the discs 21, a limiting ring 29 is provided.

Figure 3:
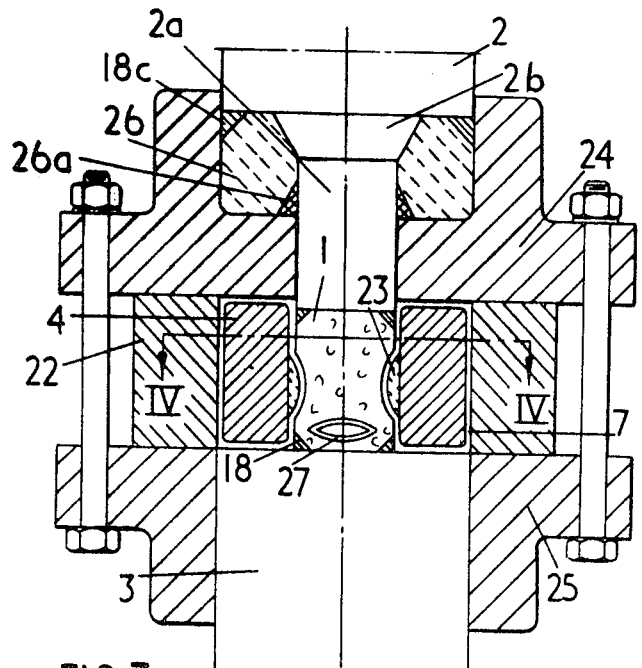
FIG. 3 is a sectional view showing another form of construction of apparatus according to the invention.
Figure 4:
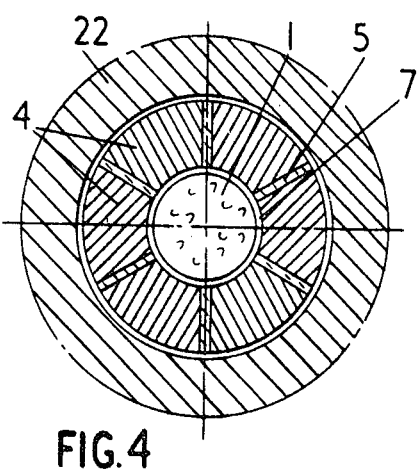
FIG. 4 is a section along the line IV—IV of FIG. 3.

Turning now to FIGS. 3 and 4, these show a cylinder 22 surrounding a cylindrical body constructed from pieces 4. The pieces 4 are surrounded by a casing 7 and pressure-supporting materials are enclosed in the gaps 5 between the pieces 4. The casing 7 is provided with a bulge 23 extending into the high pressure chamber 1. The cylinder 22 is located between bearing plates 24 and 25 which are joined together by tension bolts. The movable pressure generating member 2 has an innermost cylindrical part 2a and a conical part 2b. The part 2a is arranged to enter the high pressure chamber. The high pressure chamber 1 is limited at its lower end by a fixed lower pressure member 3, which is shown in FIG. 3 as cylindrical, but which may be of a form similar to the member 2. A space 26 between the piston 2 and the plate 24 is filled with highly compressible pressure-supporting material and this is prevented from passing through the small clearance between the member 2 and the plate 24 by a sealing gasket 18c. Reference numeral 26a indicates a mass of pressure-supporting material which can also act as a lubricant between the cylindrical part 2a and the aperture through the plate 24. When the piston 2 moves towards the centre of the high pressure chamber, high pressure is generated in the pressure-supporting material in the space 26 to support radial pressures in the parts 2a and 2b. At the same time, the pressure supporting material in the casing 7 is pressurized and the volume of the bulge 23 is decreased. Lubricating pressure-supporting material is forced in between the part 2a of the movable member 2 and the pulse 24 from the mass 26a. The volume of the various quantities of pressure-supporting material and the volume of the bulge 23 are chosen so that each part of the apparatus attains the requisite supporting pressure and the volume of the bulge 23 is reduced to zero when the desired maximum pressure in the high pressure chamber 1 is achieved. The bulge 23 may have any suitable shape. If the high pressure chamber 1 contains one or more materials which significantly reduce in volume when treated in the high pressure chamber, it may be desirable to locate in the high pressure chamber a body 27 formed from or filled with a compressible and expansible material. Thus, a sudden change in volume, due to the constriction under pressure of the material being treated, will lead to expansion of the body 27 so that the pressure drop resulting from the contraction is limited. A suitable material for use for the compressible and extensible body 27 is potassium.

Figure 5:
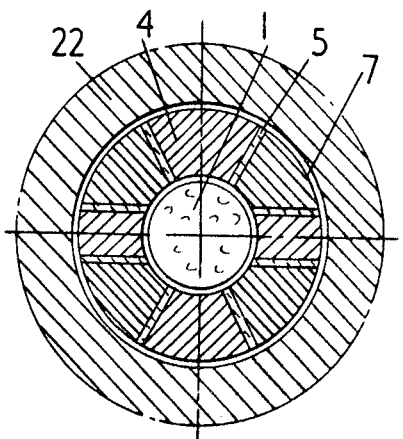
FIG. 5 is a view similar to FIG. 4 and showing a modification thereof.
Figure 6:
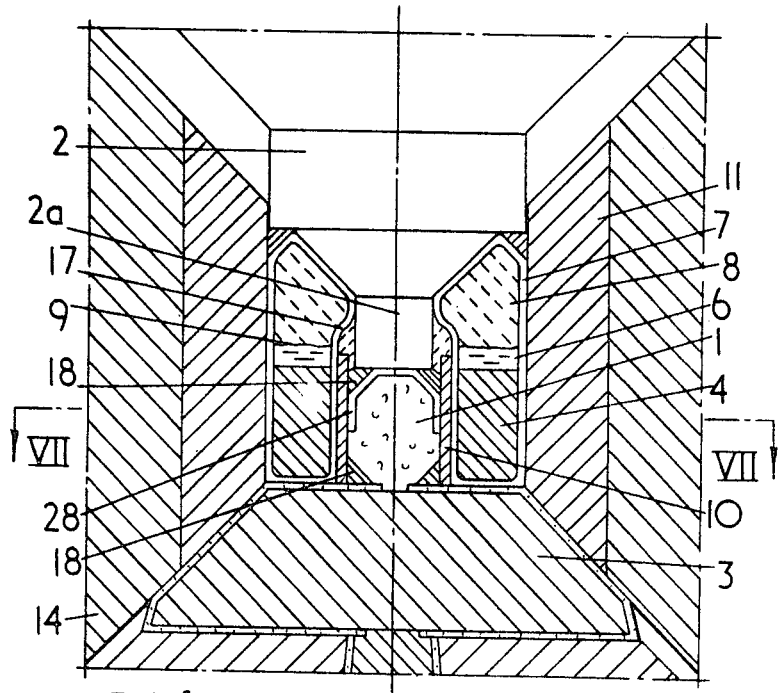
FIG. 6 is a sectional view of another form of construction of apparatus according to the invention.

FIG. 5 is a section similar to FIG. 4 but it shows a possible variation in the arrangement in the pieces 4 and the gaps 5 between them.

Figure 7:
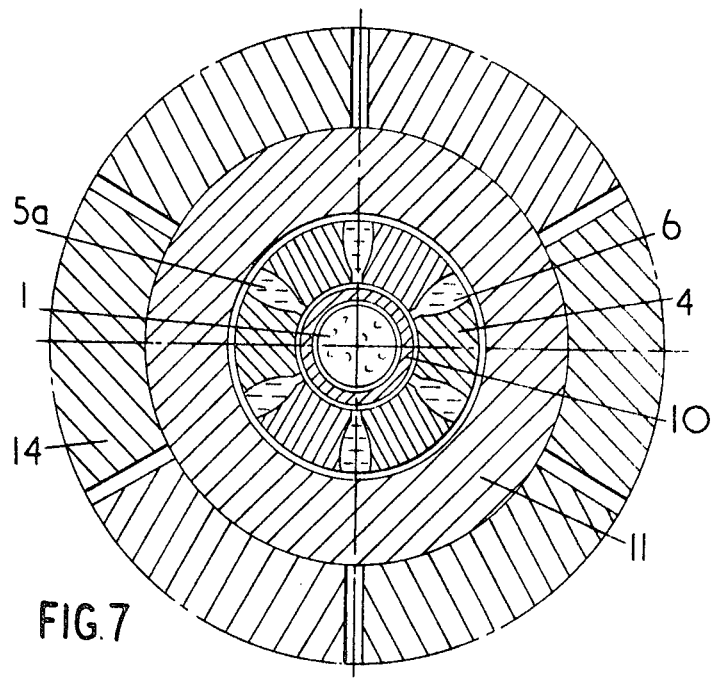
FIG. 7 is a section along the line VII—VII of FIG. 6.

FIGS. 6 and 7 show a further alternative form of apparatus. In order to be able to use a pressure-supporting material which is liquid under normal conditions under temperature and pressure, for instance one of the lower normal alcohols, in the space 17, a gasket cap 28 is placed over the high pressure chamber so as to prevent leakage of the liquid pressure-supporting material from the space 17 into the high pressure chamber 1. As mentioned before, the pressure-supporting material at this point must also be suitable to act as a lubricant and for this purpose a lubricant material may need to be suspended in the pressure-supporting material. It is also to be noticed that in this modification, the second girdle constituted by the casing 12 with its enclosed pressure-supporting material 13 has been omitted.

FIG. 7 also shows how the shape of the gaps between the spaces 4 may be varied as shown at 5a. The inner ends of these gaps must be narrow enough to prevent the ring 10 from entering the gap under the pressure difference between the high pressure chamber 1 and the pressure-supporting material in the gap. The gaps are made wider as shown in order that a more viscous pressure-supporting material may be used without causing a noticeable pressure drop within the gap. Supporting pressure is thus available along the whole axial length of the gap even with pressure-supporting materials which are extremely viscous.

The metals to be used for the various parts of the apparatus must necessarily be chosen in order to stand up to the stresses and strains encountered during use of the apparatus for generating very high pressures within chamber 1. High-grade steels, alloy steels, alloys and/or cemented carbides of the type known as hard metals may be used where appropriate.

Surfaces of such parts which are exposed during use to fluids or fluid-like metals may be protected with sealing coatings such as of suitable metals. Further, when a component is built up from separate smaller elements, the smaller elements may be provided with such sealing coatings.

In the foregoing description, the outer wall of the body made up from the pieces 4 has been described as being cylindrical. It is within the scope of the invention to vary the shape of this wall so that the thickness of the body is greater near the central zone of the high pressure chamber 1 than near its axially extreme parts.

Various other modifications may be made within the scope of the invention.

I claim:

1. In a method of increasing the radial compressive strength of a housing surrounding a high pressure chamber in which high pressure is to be generated by two opposed pressure-generating members, at least one of the pressure generating members being movable inwards towards the centre of the high pressure chamber to generate the high pressure, a part of the housing which is situated close to the high pressure chamber and which forms a primary resistance to radial pressures generated therein being formed of a plurality of separate pieces and being surrounded by a unitary cylindrical ring: the improvement that the separate pieces are separated by gaps included in at least one closed space, that pressure supporting material is provided in the gaps and that the said at least one closed space is pressurized to pressurize the pressure supporting material in the gaps to provide circumferential supporting pressure to the separate pieces.

2. A method according to claim 1, in which the pieces and the pressure supporting material are enclosed in a sealed deformable casing.

3. In a high pressure apparatus comprising a high pressure chamber, two opposed pressure generating members of which at least one is movable into the high pressure chamber to generate high pressure therein, and a housing surrounding the high pressure chamber, in which the housing includes a composite body surrounding the high pressure chamber and forming a primary resistance to radial pressures in the high pressure chamber, the said composite body being formed of a plurality of separate pieces and a unitary cylindrical ring surrounding the composite body: the improvement that the separate pieces are separated by gaps, each gap constituting at least part of at least one closed space, pressure supporting material in the said gaps, and means for pressing the said at least one closed space and the pressure supporting material in the gaps as the said at least one movable pressure generating member moves towards the high pressure chamber.

4. Apparatus as claimed in claim 3, in which the pieces and the gaps between them together have the form of a body with a cylindrical outer form and a central aperture extending through the body and including the high pressure chamber.

5. Apparatus as claimed in claim 4, in which the cross-section of the aperture is a circle.

6. Apparatus as claimed in claim 4, in which the cross-section of the aperture is a polygon.

7. Apparatus as claimed in claim 3, comprising a sealed and deformable casing, the said separate pieces and the pressure supporting material being enclosed in the said casing.

8. Apparatus as claimed in claim 3, in which the said at least one movable pressure generating member comprises two forms of parts arranged alternately, the first form having a constant cross-sectional area, and the said form having a cross-sectional area increasing in a direction away from the high pressure chamber.

9. Apparatus as claimed in claim 7, in which the casing extends from the said separate pieces in a direction towards the movable pressure generating member, and forms a girdle which surrounds and is adapted to bear on the movable pressure generating member.

10. Apparatus as claimed in claim 9, in which the girdle is filled with pressure-supporting material and forms part of a closed space which also includes the gaps.

11. Apparatus as claimed in claim 7, in which the casing has a bulge extending into the high pressure chamber.

12. Apparatus as claimed in claim 10, in which different materials are used as pressure supporting materials in different parts of the closed spaces, and including sealing deformable membranes separating the different materials from each other.

13. Apparatus as claimed in claim 3, in which a space is arranged around the said at least one movable pressure generating member, pressure supporting material being arranged in the said space so as to be pressurized as the movable pressure generating member moves into the high pressure chamber.

14. Apparatus as claimed in claim 9, comprising a sealed and deformable casing arranged around the movable pressure generating member so as to define a space, and pressure supporting material in the said space, the said seal sealed and deformable casing forms a second girdle which is further from the axis of the high pressure chamber than the said girdle.

15. Apparatus as claimed in claim 8, in which an end part of the movable pressure generating member is divided into a plurality of pieces.

16. Apparatus as claimed in claim 15, in which the pieces of the said end part together make up a cylinder.

17. Apparatus as claimed in claim 16, in which at least some of the pieces of the said end part are separated by gaps, and comprising pressure supporting material in the said gaps.

References Cited

UNITED STATES PATENTS 2,554,499    5/1951    Poulter _____ 18—16RX

J. SPENCER OVERHOLSER, Primary Examiner

D. S. SAFRAN, Assistant Examiner

U.S. Cl. X.R.

29—241; 18—34, 16, High Pressure Digest